United States Patent
Pierscieniak et al.

(10) Patent No.: US 11,424,940 B2
(45) Date of Patent: Aug. 23, 2022

(54) STANDALONE TOOL FOR CERTIFICATE MANAGEMENT

(71) Applicant: VMware, Inc., Palo Alto, CA (US)

(72) Inventors: Krzysztof K Pierscieniak, Palo Alto, CA (US); Samdeep Nayak, Bangalore (IN); Ranganathan Srinivasan, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 472 days.

(21) Appl. No.: 16/512,423

(22) Filed: Jul. 16, 2019

(65) Prior Publication Data

US 2020/0382324 A1   Dec. 3, 2020

(30) Foreign Application Priority Data

Jun. 1, 2019 (IN) .............................. 201941021825

(51) Int. Cl.
*H04L 9/32* (2006.01)
*G06F 9/451* (2018.01)
*H04L 9/40* (2022.01)

(52) U.S. Cl.
CPC ............ *H04L 9/3268* (2013.01); *G06F 9/451* (2018.02); *H04L 63/08* (2013.01)

(58) Field of Classification Search
CPC ....... H04L 9/3268; H04L 63/08; H04L 63/10; H04L 63/062; G06F 9/451
See application file for complete search history.

(56) References Cited

U.S. PATENT DOCUMENTS

| | | | |
|---|---|---|---|
| 5,687,235 A * | 11/1997 | Perlman | H04L 9/3268 713/158 |
| 6,487,658 B1 * | 11/2002 | Micali | H04L 9/3268 713/158 |
| 8,255,915 B1 | 8/2012 | Blanding et al. | |
| 8,266,616 B1 * | 9/2012 | Jacquot | G06F 8/65 717/177 |
| 8,724,848 B1 | 5/2014 | Heath et al. | |
| 9,553,771 B1 | 1/2017 | Mckenna et al. | |
| 9,614,833 B1 * | 4/2017 | Rao | H04L 63/0823 |
| 9,641,344 B1 * | 5/2017 | Kim | H04L 9/006 |
| 9,929,780 B2 | 3/2018 | Abbondanzio et al. | |
| 10,027,596 B1 | 7/2018 | Harwood | |
| 10,083,051 B1 | 9/2018 | Mahapatra et al. | |
| 10,205,803 B1 * | 2/2019 | Sharifi Mehr | H04L 41/0686 |
| 10,447,546 B1 * | 10/2019 | Guo | G06F 11/301 |
| 10,454,690 B1 * | 10/2019 | Popoveniuc | H04L 9/30 |
| 10,666,424 B1 * | 5/2020 | Rutley | H04L 9/3239 |

(Continued)

OTHER PUBLICATIONS

Kovar, Software-Defined Data Centers: Should You Jump On The Bandwagon?, May 13, 2013, pp. 2, 4-6.

*Primary Examiner* — Aravind K Moorthy

(57) ABSTRACT

A computer-implemented method for using a standalone tool for certificate management is provided. The standalone tool for certificate management is provided between a plurality of computing nodes and a management node. The standalone tool determines a certificate status for each of the plurality of computing nodes in the computing system. The standalone tool also determines any certificate operations for each of the plurality of computing nodes in the computing system. The certificate status and any of the certificate operations are presented in a consolidated view.

8 Claims, 16 Drawing Sheets

(56) References Cited

U.S. PATENT DOCUMENTS

| | | | |
|---|---|---|---|
| 10,771,261 B1* | 9/2020 | Lazar | H04L 9/3247 |
| 10,911,433 B1* | 2/2021 | Anand | H04L 9/3247 |
| 2006/0184349 A1 | 8/2006 | Goud et al. | |
| 2007/0143629 A1 | 6/2007 | Hardjono et al. | |
| 2007/0150737 A1* | 6/2007 | Parupudi | H04L 9/3263 |
| | | | 713/175 |
| 2008/0271034 A1 | 10/2008 | Miyata | |
| 2008/0275975 A1 | 11/2008 | Pandey et al. | |
| 2009/0041205 A1* | 2/2009 | Russell | H04M 3/436 |
| | | | 379/35 |
| 2009/0177461 A1* | 7/2009 | Ehsani | G06F 40/40 |
| | | | 704/2 |
| 2010/0101339 A1 | 4/2010 | Tatsutani et al. | |
| 2010/0138907 A1* | 6/2010 | Grajek | H04L 63/0823 |
| | | | 726/10 |
| 2011/0055588 A1 | 3/2011 | Dehaan | |
| 2011/0191217 A1* | 8/2011 | Saiu | G06Q 10/1091 |
| | | | 705/32 |
| 2011/0213966 A1* | 9/2011 | Fu | H04L 9/3268 |
| | | | 713/158 |
| 2011/0276951 A1 | 11/2011 | Jain | |
| 2011/0298607 A1 | 12/2011 | Priyantha et al. | |
| 2012/0072721 A1* | 3/2012 | Rescorla | H04L 63/20 |
| | | | 713/158 |
| 2012/0072910 A1* | 3/2012 | Martin | G06F 9/4843 |
| | | | 718/1 |
| 2012/0116590 A1 | 5/2012 | Florez-Larrahondo et al. | |
| 2012/0137289 A1 | 5/2012 | Nolterieke et al. | |
| 2012/0180055 A1 | 7/2012 | Brech et al. | |
| 2013/0007868 A1* | 1/2013 | Hoggan | H04L 63/0815 |
| | | | 726/8 |
| 2013/0117558 A1* | 5/2013 | Metke | H04L 9/3268 |
| | | | 713/156 |
| 2013/0159910 A1* | 6/2013 | Bostic | G06F 11/3048 |
| | | | 715/772 |
| 2013/0179947 A1* | 7/2013 | Kline, III | H04L 67/28 |
| | | | 726/4 |
| 2013/0219068 A1 | 8/2013 | Ballani et al. | |
| 2013/0223684 A1 | 8/2013 | Townend et al. | |
| 2014/0006862 A1 | 1/2014 | Jain et al. | |
| 2014/0055248 A1 | 2/2014 | Hammelbacher | |
| 2014/0136511 A1* | 5/2014 | Hughes | G06F 16/901 |
| | | | 707/714 |
| 2014/0278703 A1* | 9/2014 | Owens, Jr. | G06Q 10/06313 |
| | | | 705/7.23 |
| 2014/0298091 A1 | 10/2014 | Carlen et al. | |
| 2014/0331297 A1* | 11/2014 | Innes | H04L 63/0281 |
| | | | 726/7 |
| 2015/0009013 A1 | 1/2015 | Cartwright et al. | |
| 2015/0067294 A1 | 3/2015 | Hu et al. | |
| 2015/0098608 A1 | 4/2015 | Hintermeister et al. | |
| 2015/0234617 A1 | 8/2015 | Li et al. | |
| 2015/0318996 A1* | 11/2015 | van Roermund | H04W 12/069 |
| | | | 713/158 |
| 2015/0341220 A1 | 11/2015 | Sikand et al. | |
| 2015/0370583 A1 | 12/2015 | Shah et al. | |
| 2015/0370587 A1 | 12/2015 | Kureha et al. | |
| 2016/0134621 A1* | 5/2016 | Palanigounder | H04W 12/35 |
| | | | 713/156 |
| 2016/0299957 A1 | 10/2016 | A. C. et al. | |
| 2016/0337446 A1 | 11/2016 | Abali et al. | |
| 2016/0344768 A1* | 11/2016 | Mcgrew | H04L 63/1425 |
| 2016/0380815 A1 | 12/2016 | Agarwal et al. | |
| 2017/0006022 A1* | 1/2017 | Gunti | H04L 63/108 |
| 2017/0094509 A1* | 3/2017 | Mistry | H04L 63/0823 |
| 2017/0163481 A1* | 6/2017 | Figueroa | H04L 67/42 |
| 2017/0255494 A1 | 9/2017 | Bartfai-Walcott et al. | |
| 2017/0286252 A1 | 10/2017 | Illikkal et al. | |
| 2017/0293447 A1 | 10/2017 | Bivens et al. | |
| 2018/0012261 A1* | 1/2018 | Cai | G06Q 30/0271 |
| 2018/0097803 A1* | 4/2018 | Iwanir | H04L 63/0815 |
| 2018/0143854 A1* | 5/2018 | Kumar | G06F 9/505 |
| 2018/0159837 A1* | 6/2018 | Kola | H04L 9/3268 |
| 2018/0211178 A1* | 7/2018 | Millius | G06Q 10/10 |
| 2018/0248949 A1* | 8/2018 | Siddappa | H04L 67/1002 |
| 2018/0287804 A1* | 10/2018 | Geisbush | H04L 63/10 |
| 2018/0295036 A1 | 10/2018 | Krishnamurthy et al. | |
| 2018/0367521 A1* | 12/2018 | Daidone | H04L 63/08 |
| 2019/0108239 A1* | 4/2019 | Yang | G06F 16/182 |
| 2019/0132309 A1* | 5/2019 | Wei | H04L 63/126 |
| 2019/0190893 A1* | 6/2019 | Troia | H04L 9/0643 |
| 2019/0235902 A1 | 8/2019 | Wei et al. | |
| 2019/0245700 A1* | 8/2019 | Dobre | H04L 9/321 |
| 2019/0278663 A1 | 9/2019 | Mehta et al. | |
| 2020/0014636 A1* | 1/2020 | Vallepalli | H04L 45/745 |
| 2020/0028842 A1* | 1/2020 | Leiserson | H04L 63/101 |
| 2020/0183743 A1* | 6/2020 | Moore | G06F 9/5077 |

\* cited by examiner

FIG. 16

STANDALONE TOOL FOR CERTIFICATE MANAGEMENT

RELATED APPLICATIONS

Benefit is claimed under 35 U.S.C. 119(a)-(d) to Foreign Application Serial No. 201941021825 filed in India entitled "STANDALONE TOOL FOR CERTIFICATE MANAGEMENT", on Jun. 1, 2019, by VMWARE, INC., which is herein incorporated in its entirety by reference for all purposes.

BACKGROUND

Secure Sockets Layer/Transport Layer Security (SSL/TLS) is a protocol for securing traffic in a computing system/network. In general, SSL/TLS is used for establishing trust between two endpoints and the traffic is encrypted by the sender and decrypted by the receiver. In some instances, SSL thumbprint (or fingerprint) verification may be required. The management of SSL thumbprints is cumbersome and not specifically defined by any standard.

Additionally, provisioning of an endpoint with a signed certificate in the computing system/network requires manual procedures. Such manual procedures may increase chance of error and may be cumbersome to the user to maintain and manage thousands of endpoints in the computing system/network.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 16 is a block diagram of the CMS output to a GUI that provides a single management interface for all SDDC certificate operations, according to various embodiments.

DESCRIPTION OF EMBODIMENTS

Figure 1:
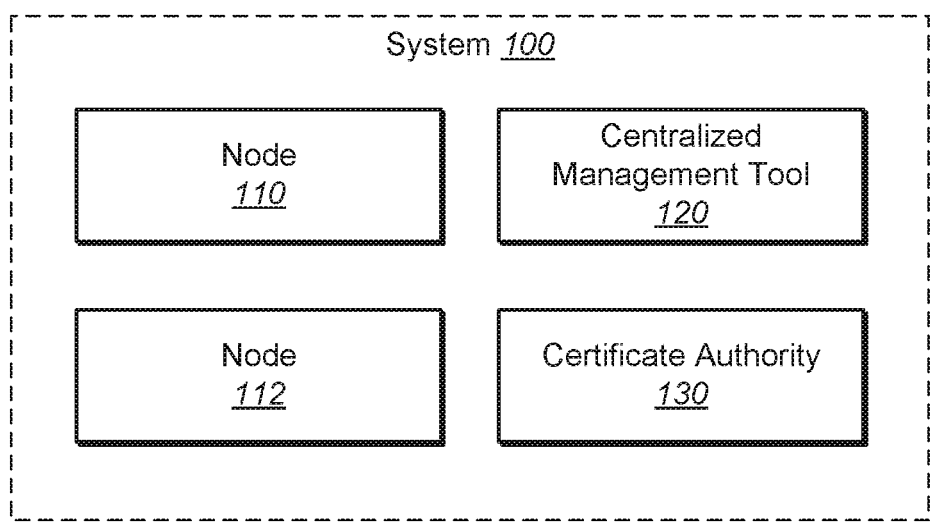
FIG. 1 depicts a block diagram of a distributed computing system, according to various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included in the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

NOTATION AND NOMENCLATURE

Some portions of the detailed descriptions which follow are presented in terms of procedures, logic blocks, processing and other symbolic representations of operations on data bits in a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "connecting," "displaying," "receiving," "providing," "determining," "generating," "establishing," "managing," "extending," "creating," "migrating," "effectuating," or the like, refer to the actions and processes of an electronic computing device (e.g., ClientMachine) or system such as: a host processor, a processor, a memory, a virtual storage area network (VSAN), a virtualization management server or a virtual machine (VM), software-defined data center (SDDC), VMware Analytics Cloud (VAC) infrastructure, among others, of a virtualization infrastructure or a computer system of a distributed computing system, or the like, or a combination thereof. It should be appreciated that the virtualization infrastructure may be on-premises (e.g., local) or off-premises (e.g., remote or cloud-based), or a combination thereof. The electronic device manipulates and transforms data represented as physical (electronic and/or magnetic) quantities in the electronic device's registers and memories into other data similarly represented as physical quantities in the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the Figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided in dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

I. Automated Provisioning of Certificates

A. Distributed Computing System

FIG. 1 depicts an embodiment of a block diagram of computing system 100. Computing system 100 includes, among other things, a plurality of nodes or endpoints (e.g., nodes 110 and 112), centralized management tool 120 and certificate authority 130.

System 100 can be any computing system or network that includes various endpoints or computing nodes that are able to provide for communication within system 100. System 100 can be but is not limited a virtualization infrastructure, storage area network (SAN), etc. In one embodiment, system 100 is a distributed system.

Nodes 110 and 112 are any endpoint device or computing nodes that are able to communicate with one another in a networked environment. In one embodiment, the nodes are hosts (e.g., ESX hosts, ESXi hosts and the like) in a virtualization infrastructure that provides the underlying hardware for supporting virtual machines and their respective workloads. In another embodiment, the nodes are storage devices in a SAN. It should be appreciated that system 100 can include any number of nodes such as thousands of nodes.

Communication or data traffic within system 100, in one embodiment, is secured by the Secure Sockets Layer/Transport Layer Security (SSL/TLS) protocol, referred to herein as SSL, which is a standard security technology for establishing an encrypted link between nodes (e.g., a server and a client). As such, SSL allows sensitive information such as login credentials to be transmitted securely.

Centralized management tool 120 is a central management point for system 100. In general, centralized management tool 120 is a suite of virtualization tools (e.g., vSphere suite). For example, centralized management tool 120 allows for the management of multiple ESX servers and virtual machines from different ESX servers through a single console application. Centralized management tool 120 can be stored and executed on one the hosts (e.g., node 110 or node 112) or can be stored and executed on another physical device (e.g., client device) that is communicatively coupled with system 100.

Centralized management tool 120 enables a user (e.g., IT administrator) to manage system 100 from a single or centralized tool, via a user interface. For example, resource utilization and/or health of nodes may be controlled via centralized management tool 120.

Additionally, centralized management tool 120 enables for centralized management and automated provisioning of digital certificates to the nodes in system 100. For example, centralized management tool 120 automates the provisioning of SSL certificates to the nodes. In general, SSL Certificates are small data files that digitally bind a cryptographic key to an organization's details. When installed on a node, the certificate allows for secure connections with the node. In one embodiment, the digital certificates are X.509 certificates.

It should be appreciated that the centralized management and automated provisioning of digital certificates to the nodes in system 100 may be provided via a UI and/or APIs. Additionally, APIs at the host and centralized management tool level may be utilized to push certificates, keys, CRLs. Moreover, users may configure options to adjust notification levels, modes of operation, and certificate metadata via a UI and/or APIs.

Certificate authority 130 is an authorized authority that issues the certificates. In general, a certificate authority is an entity that issues digital certificates. A digital certificate certifies the ownership of a public key by the named subject of the certificate. This allows others (relying parties) to rely upon signatures or on assertions made by the private key that corresponds to the certified public key. In this model of trust relationships, a certificate authority is a trusted third party—trusted both by the subject (owner) of the certificate and by the party relying upon the certificate. In one embodiment, certificate authority 130 is provided and/or controlled by the entity that provides or develops centralized management tool (e.g., VMware). In another embodiment, certificate authority 130 is provided and/or controlled by an entity that is different than the entity that provides or develops the centralized management tool.

Certificate authority 130, in one embodiment, is a root certificate authority. In another embodiment, certificate authority 130 is an intermediary certificate authority to another certificate authority (not shown).

Various non-limiting embodiments of the SSL protocol relating to certificates are provided below:

SSL is used for establishing trust between two endpoints and then the traffic (data) is encrypted by the sender and decrypted by the receiver. Typically, SSL certificate validation is done by validating the certificate of the endpoint against a set of trusted root certificates. If no root certificate that can trust the endpoints' certificate is found, the certificate is deemed not trusted.

However, the above mechanism works when there are properly signed certificates used by the endpoints and when the relevant trusted root certificates are present on the client side.

In the cases where either the endpoint has self-signed certificates or the client does not have the relevant root certificates that signed the endpoints' certificates, an external entity (e.g., an administrator) can assign trust to that endpoints' certificate by explicitly telling the client to trust the incoming certificate. As a result, the client remembers some metadata of the incoming certificate (e.g., fingerprint of the certificate) such that it can trust that certificate later on. This mechanism is often called trust on first use (TOFU).

B. Method of Automated Provisioning of Digital Certificates

Figure 2:
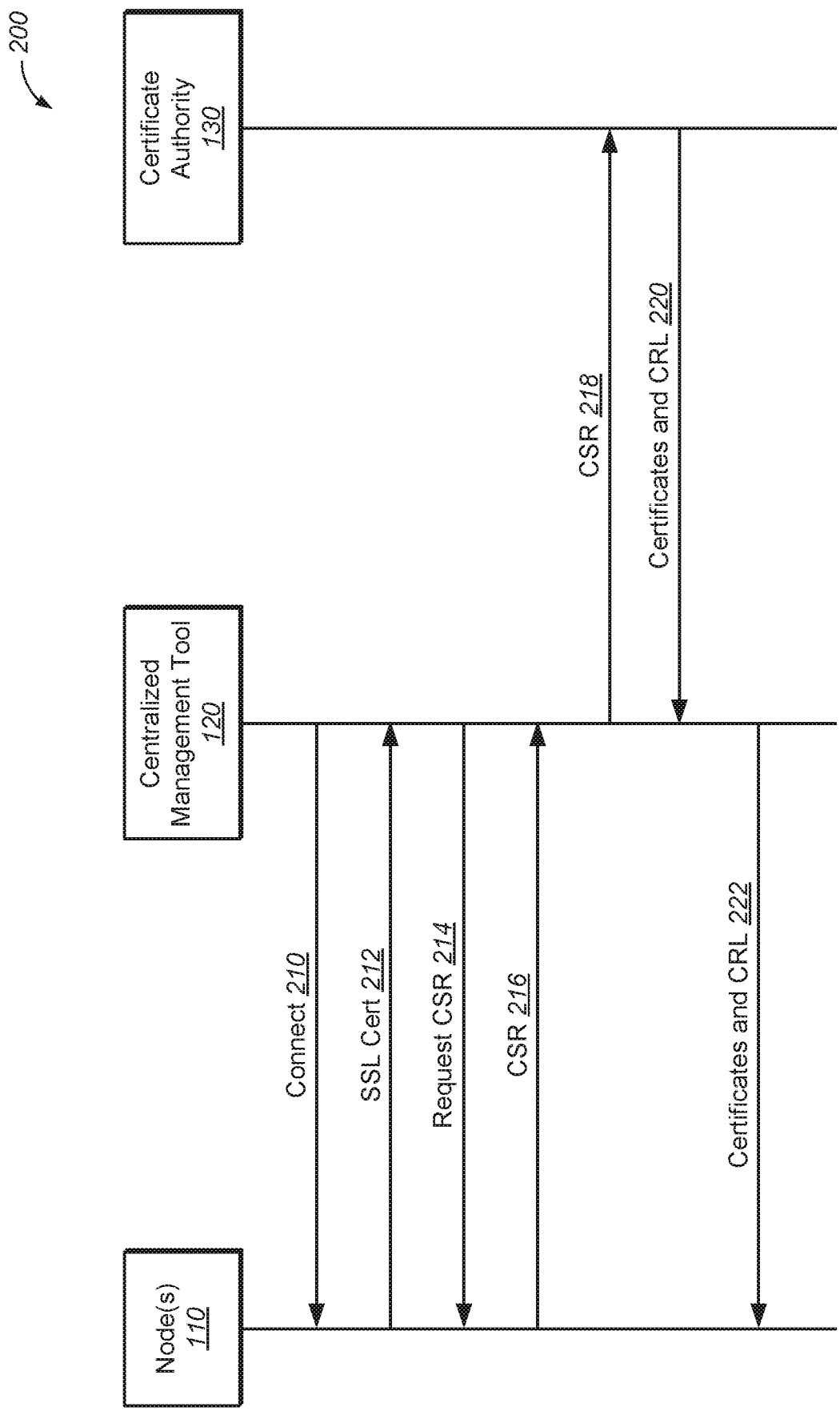
FIG. 2 depicts a flow diagram for a method for automated provisioning a certificate in a computing system, according to various embodiments.

FIG. 2 depicts an embodiment of a "swim lane" flow chart for a method 200 of automated provisioning of digital certificates.

At 210 of method 200, centralized management tool 120 connects/provisions node 110 to system 100. In one embodiment, node 110 is an ESX host that is configured to host various virtual machines in a virtualization infrastructure.

At 212, an unsigned SSL certification is transmitted to centralized management tool 120. It is noted that when node 110 is added to system 100, node 110 self-signs a certificate. However, a self-signed certificate is not deemed trustworthy in system 100. As such, communication with node 110 is not deemed to be to be trustworthy.

In one embodiment, subsequent step 212 (and prior to step 214), there is a resulting trust on first use. For example, the TOFU occurs based on the administrator assigns a trust to the endpoints' certificate by telling the client to trust the incoming certificate.

At 214, centralized management tool 120 requests a certificate signing request (CSR) from the node that is to be or just added to system 100. In general, a CSR is a message sent from an applicant to a certificate authority in order to apply for a digital identity certificate. Additionally, a CSR is a block of encrypted text that is generated on the server that the certificate will be used on. It contains information that will be included in the certificate such as your organization name, common name (domain name), locality, and country. It also contains the public key that will be included in the certificate. A private key is usually created at the same time that you create the CSR.

At 216, node 110 provides a CSR to centralized management tool 120.

At 218, centralized management tool 120 provides the CSR to certificate authority 130. That is, the centralized management tool presents the CSR to the certificate authority on behalf of the node. In one embodiment, certificate metadata is provided to certificate authority 130.

At 220, in response to receiving CSR from node 110 (via centralized management tool 120), certificate authority 130 generates certificates. For example, certificate authority 130 creates a certificate for node 110 and signs the certificate with a signing key.

The certificates the certificate authority generates may be, but is not limited to, a signed certificate, trusted certificate, root certificate, etc.

Additionally, certificate authority generates a certificate revocation list (CRL). In general, a CRL is a list of certificates (or a list of serial numbers for certificates) that have been revoked. Therefore, nodes or entities presenting those (revoked) certificates should no longer be trusted.

At 222, centralized management tool 120, upon receiving the certificates and CRL from certificate authority 130, transmits (e.g., pushes) the certificates and CRL to node 110. As a result, centralized management tool 120 automatically provisions node 110 with signed SSL certificates at the time node is added to system 100. Moreover, node 110 is trusted within system 100 at the time node is added to system 100. That is, the node is automatically trusted by any service that has the certificate authorities root certificate in its trust-store.

In general, the root certificate is the signing certificate of the certificate authority that signs the node's certificate.

Upon receiving the certificates, node 110 refreshes its SSL context and starts using the new trusted certificates.

In various embodiments, node 110, prior to being added to or transitioning into system 100, may include older and untrustworthy certificates. In response, to receiving updated certificates and a CRL (as described in step 222), node 110 refreshes its SSL context and starts using the new trusted certificates.

C. Certificate Modes

Various modes can be utilized to provision certificates. Such modes can include a default mode, a custom certificate mode and a thumbprint mode.

The default mode, in one embodiment, is when certificate authority 130 is provided by the same entity (e.g., VMware) as the entity that provides centralized management tool 120. In such an embodiment, certificate authority 130 is a VMware certificate authority. Moreover, by default, the VMware certificate authority is used as the certificate authority for node certificates (e.g., ESXi host certificates). The VMware certificate authority is the root certificate authority by default, but it can be set up as an intermediary certificate authority to another certificate authority. In this mode, users can manage certificates from vSphere Web Client (e.g., centralized management tool 120).

The custom mode, in one embodiment, enables users to manage their own external certificate authority if they so desire. In this mode, customers are responsible for managing certificates.

The thumbprint mode, in one embodiment, is a fallback mode if, for example, the default mode is not working properly. In this mode, each of the certificates includes a thumbprint. The thumbprint is a hash value computed over the complete certificate, which includes all its fields, including the signature.

D. Example Methods of Operation

Figure 3:
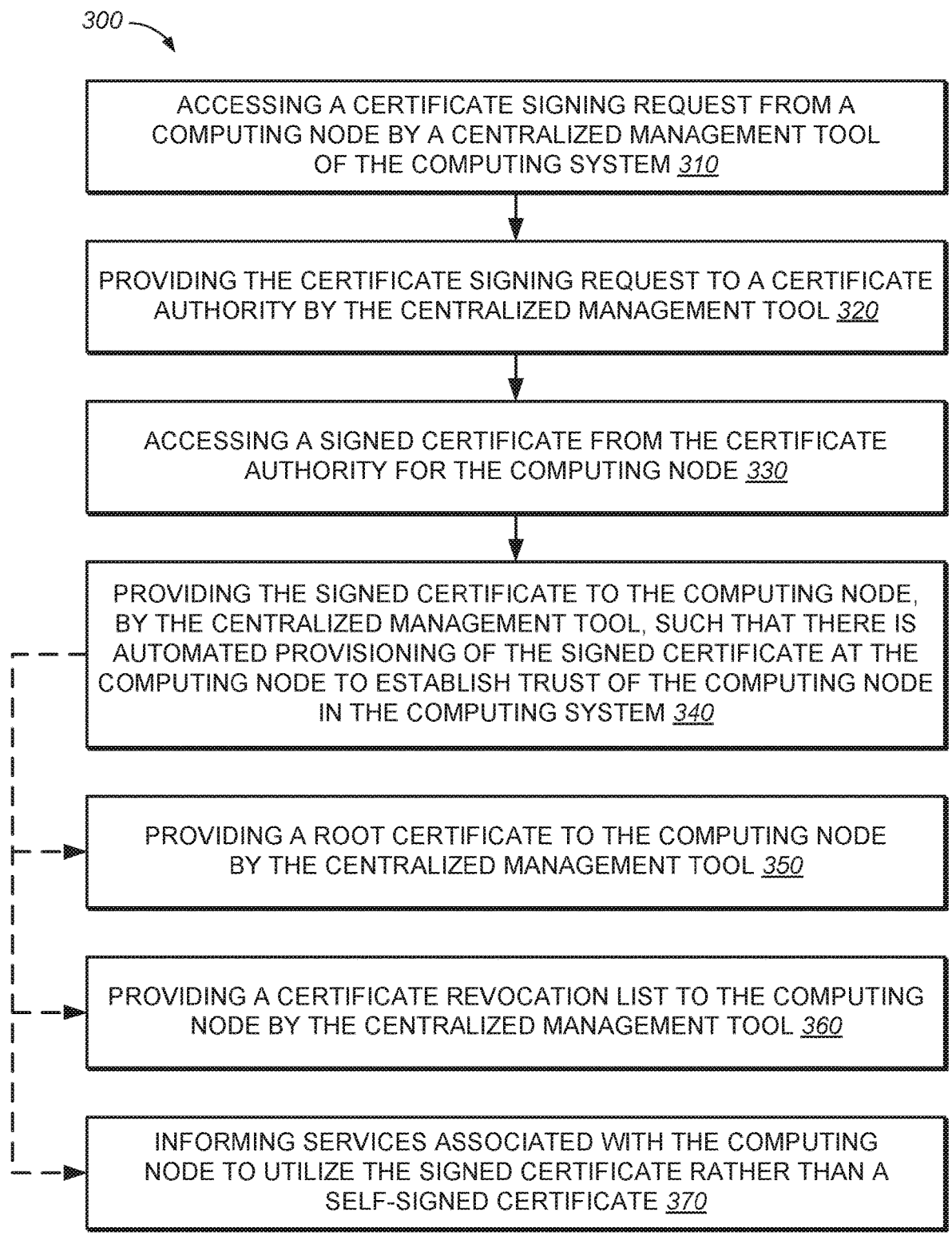
FIG. 3 depicts a flow diagram for a method for automated provisioning a certificate in a computing system, according to various embodiments.
Figure 4:
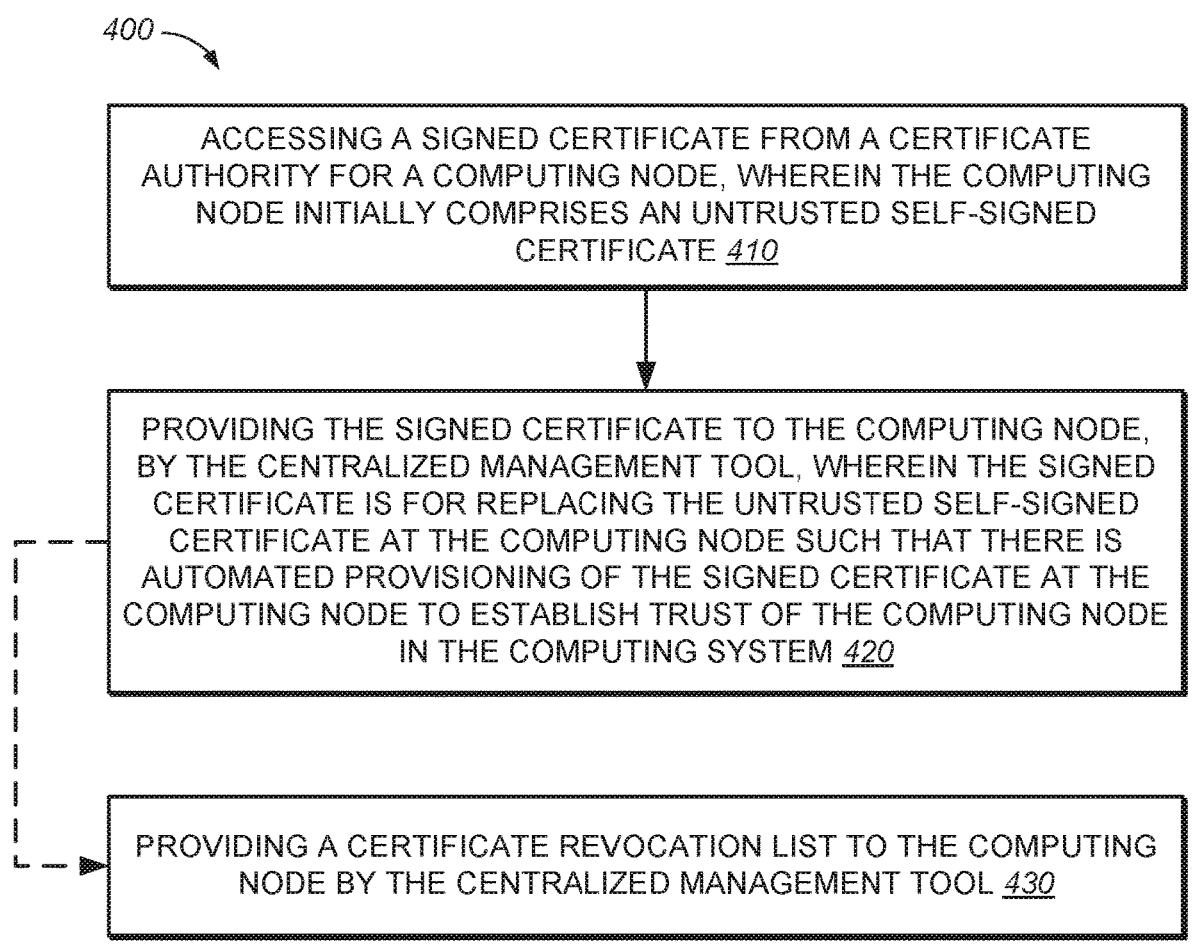
FIG. 4 depicts a flow diagram for a method for automated provisioning a certificate in a computing system, according to various embodiments.
Figure 5:
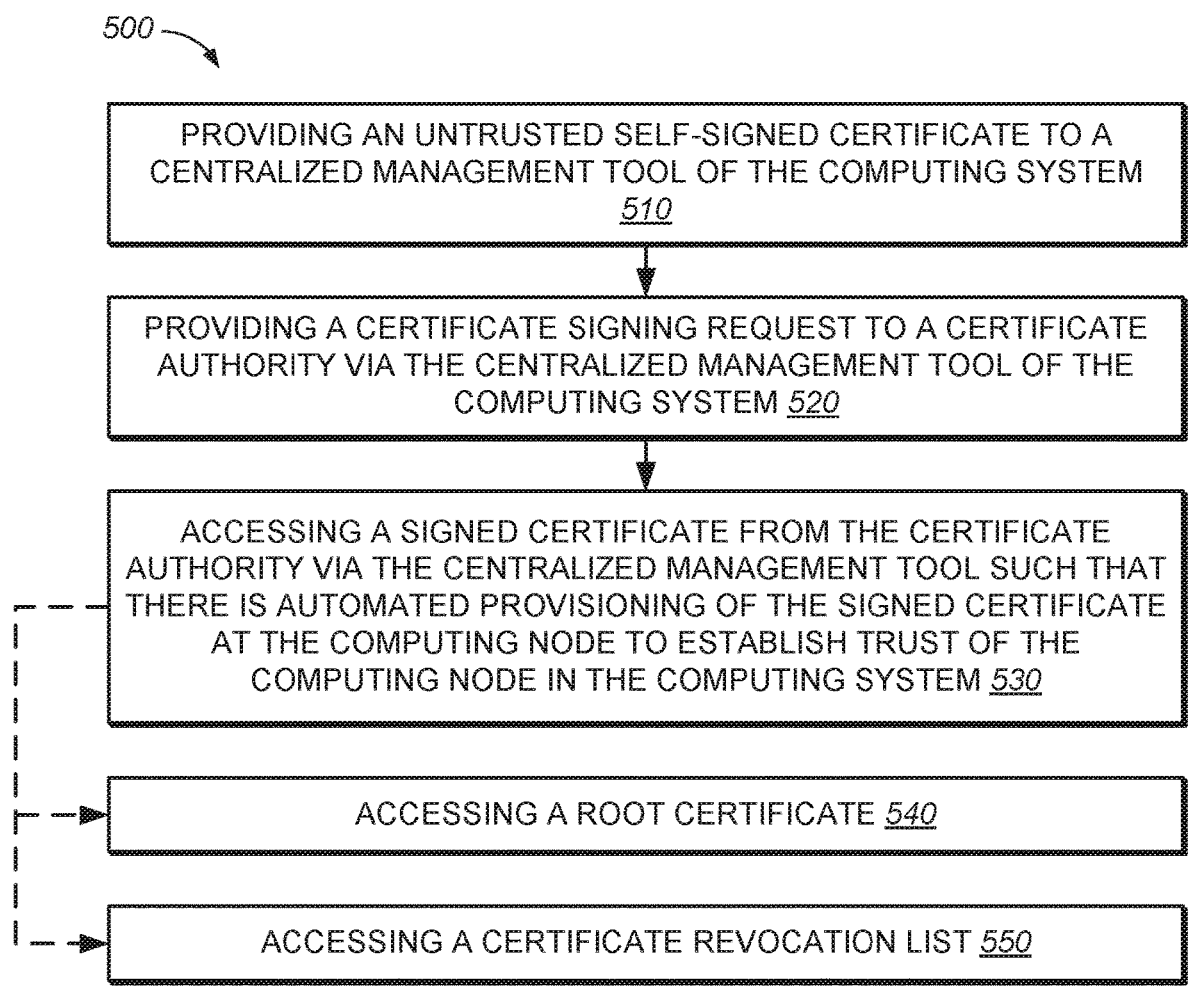
FIG. 5 depicts a flow diagram for a method for automated provisioning a certificate in a computing system, according to various embodiments.

The following discussion sets forth in detail the operation of some example methods of operation of embodiments. With reference to FIGS. 3, 4 and 5, flow diagrams 300, 400 and 500 illustrate example procedures used by various embodiments. Flow diagrams 300, 400 and 500 include some procedures that, in various embodiments, may include some steps that are carried out by a processor under the control of computer-readable and computer-executable instructions. In this fashion, procedures described herein and in conjunction with flow diagrams 300, 400 and 500 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments. The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 300, 400 and 500 such procedures are examples. That is, embodiments are well suited to performing various other procedures or variations of the procedures recited in flow diagrams 300, 400 and 500. Likewise, in some embodiments, the procedures in flow diagrams 300, 400 and 500 may be performed in an order different than presented and/or not all of the procedures described in one or more of these flow diagrams may be performed.

FIG. 3 depicts a process flow diagram 300 of a method for automated provisioning a certificate in a computing system, according to various embodiments.

At 310, accessing a certificate signing request from a computing node by a centralized management tool of the computing system. For example, centralized management tool 120 receives a CSR from node 110 that is initiated to be added to system 100.

At 320, providing the certificate signing request to a certificate authority by the centralized management tool. For example, centralized management tool 120 transmits the CSR (received from node 110) to certificate authority 130.

At 330, accessing a signed certificate from the certificate authority for the computing node. For example, centralized management tool 120 receives signed X.509 certificates from certificate authority 130.

At 340, providing the signed certificate to the computing node, by the centralized management tool, such that there is automated provisioning of the signed certificate at the computing node to establish trust of the computing node in the computing system. For example, a node to be added to system 100 receives the signed certificates from centralized management tool 120. As a result, there is an establish trust of the computing node in the computing system.

At 350, providing a root certificate to the computing node by the centralized management tool. For example, certificate authority 130 provides a root certificate to centralized management tool 120 which then transmits the root certificate to node 110.

At 360, providing a certificate revocation list to the computing node by the centralized management tool. For example, certificate authority 130 provides a CRL to centralized management tool 120 which then transmits the CRL to node 110.

At 370, informing services associated with the computing node to utilize the signed certificate rather than a self-signed certificate. For example, by receiving signed certificates from centralized management tool 120 and refreshing its SSL context the services of node 110 are informed to use the newly provided certificates.

It is noted that any of the procedures, stated above, regarding flow diagram 300 may be implemented in hardware, or a combination of hardware with firmware and/or software. For example, any of the procedures are implemented by a processor(s) of a cloud environment and/or a computing environment.

FIG. 4 depicts a process flow diagram 400 of a method for automated provisioning a certificate in a computing system, according to various embodiments.

At 410, accessing a signed certificate from a certificate authority for a computing node, wherein the computing node initially comprises an untrusted self-signed certificate. For example, centralized management tool 120 receives signed certificates from certificate authority 130 for a node to be added to system 100. The node (e.g., node 110) to be added to system 100 initially includes an untrusted self-signed certificate.

At 420, providing the signed certificate to the computing node, by the centralized management tool, wherein the signed certificate is for replacing the untrusted self-signed certificate at the computing node such that there is automated provisioning of the signed certificate at the computing node to establish trust of the computing node in the computing system. For example, centralized management tool 120 transmits the signed certificates to the node to be added to system 100. The signed certificates replace other certificates (e.g., outdated certificates, untrusted certificates) of the node. As a result, there is automated provisioning of the signed certificates at the computing node to establish trust of the computing node in the computing system.

At 430, providing a certificate revocation list to the computing node by the centralized management tool. For example, centralized management tool 120 also provides a CRL to the node.

It is noted that any of the procedures, stated above, regarding flow diagram 400 may be implemented in hardware, or a combination of hardware with firmware and/or software. For example, any of the procedures are implemented by a processor(s) of a cloud environment and/or a computing environment.

FIG. 5 depicts a process flow diagram 500 of a method for automated provisioning a certificate in a computing system, according to various embodiments.

At 510, providing an untrusted self-signed certificate to a centralized management tool of the computing system. For example, a node to be added to system 100 initially includes an untrusted self-signed certificate that is transmitted to centralized management tool 120.

At 520, providing a certificate signing request to a certificate authority via the centralized management tool of the computing system. For example, a CSR is transmitted from the node to centralized management tool 120.

At 530, accessing a signed certificate from the certificate authority via the centralized management tool such that there is automated provisioning of the signed certificate at the computing node to establish trust of the computing node in the computing system. For example, the node to be added to system 100 receives signed certificates from centralized management tool 120 (which received the certificates from certificate authority 130). As a result, there is automated provisioning of the signed certificate at the computing node to establish trust of the computing node in the computing system.

At 540, accessing a root certificate. For example, the node receives a root certificate from the certificate authority via centralized management tool 120.

At 550, accessing a certificate revocation list. For example, the node receives a CRL from the certificate authority via centralized management tool 120.

It is noted that any of the procedures, stated above, regarding flow diagram 500 may be implemented in hardware, or a combination of hardware with firmware and/or software. For example, any of the procedures are implemented by a processor(s) of a cloud environment and/or a computing environment.

II. Automated Monitoring and Managing of Certificates

As will be described in further detail below, centralized management tool 120 provides various automated and centralized monitoring and managing of certificates for nodes in system 100.

A. Automated Monitoring of Certificate Expiration

Centralized management tool 120, in various embodiments, provides for automated monitoring of certificate expiration. That is, centralized management tool 120 periodically monitors for the expiration of certificates in a node.

A signed certificate (e.g., X.509 certificate) includes a certificate expiration. In particular, when the signed certificate is signed or created the certificate includes certificate expiration that indicates when the certificate will expire and no longer trusted. If the certificate is not updated by the time the certificate expiration is met, then the certificate expires. As a result, the node that includes the expired certificate is deemed to not be trusted in system 100.

Centralized management tool 120, in various embodiments, periodically (e.g., daily, weekly, etc.) accesses the nodes in system 100 to determine the certificate expiration of the certificates in the nodes. If it is determined that a certificate of a node has an impending certificate, then centralized management tool 120 automatically creates an alert to indicate that the certificate may expire soon.

An alert may be generated in response to various time thresholds. Alerts may be presented to a use via a UI of the centralized management tool. For example, if a certificate is impending to expire within a first threshold (e.g., 8 months), then an alert is generated. The first threshold may be considered a green status.

Likewise, if a certificate is impending to expire within a second threshold (e.g., 1-8 months), then an alert is generated with a higher importance than the alert based on the first threshold. The second threshold may be considered a soft threshold or a yellow status.

On a receipt of an alert of a certificate in a threshold (e.g., soft threshold), the administrator may choose to manually refresh the certificates on the corresponding node. Alternatively, centralized management tool 120 may automatically refresh the certificates in certain cases, such as when the node whose certificate is in the soft (or hard) threshold is being added to the inventory of the centralized management tool.

Similarly, if a certificate is impending to expire within a third threshold (e.g., 1 month), then an alert is generated with a higher importance than the alert based on the second threshold. The third threshold may be considered a hard threshold or red status.

In various embodiments, if the administrator does not respond to this alert and/or does not manually refresh the certificates, centralized management tool 120 may automatically provide new certificates to the node.

The alerts of the impending expiration of certificates facilitates in the prevention of actual certificate expiration.

B. Automated Remediation of Certificate Expiration

Centralized management tool 120, in various embodiments, provides for automated remediation of certificate expiration. In particular, when a node is added to or reconnected to the computing system, centralized management tool 120 automatically accesses certificates in the node and automatically determines the certificate expiration of the certificates.

If it is determined that a certificate has an impending certificate expiration, then centralized management tool 120 automatically provides the node new certificate to replace the certificate with an impending certificate expiration.

An impending certificate expiration is determined based on various time thresholds, as described above. For example, if a certificate is set to expire within a first time frame (e.g., 8 months), then it is determined that the certificate has an impending certificate expiration. Likewise, if a certificate is set to expire within a second time frame (e.g., 1-8 months), then it is determined that the certificate has an impending certificate expiration. Similarly, if a certificate is set to expire within a third time frame (e.g., 1 month), then it is determined that the certificate has an impending certificate expiration.

C. Automated Pushing of a Certificate Revocation List

Centralized management tool 120, in various embodiments, provides for automated pushing of a CRL. For example, in response to revocation of a computing node (e.g., node 110) in computing system 100, centralized management tool 120 receives an updated CRL from certificate authority 130 and then automatically provides the CRL to other nodes in the computing system (e.g., node 112). The updated CRL indicates that the certificates associated with the revoked node are untrustworthy. As a result, other nodes in the computing system are aware that the revoked node is untrustworthy.

Figure 6:
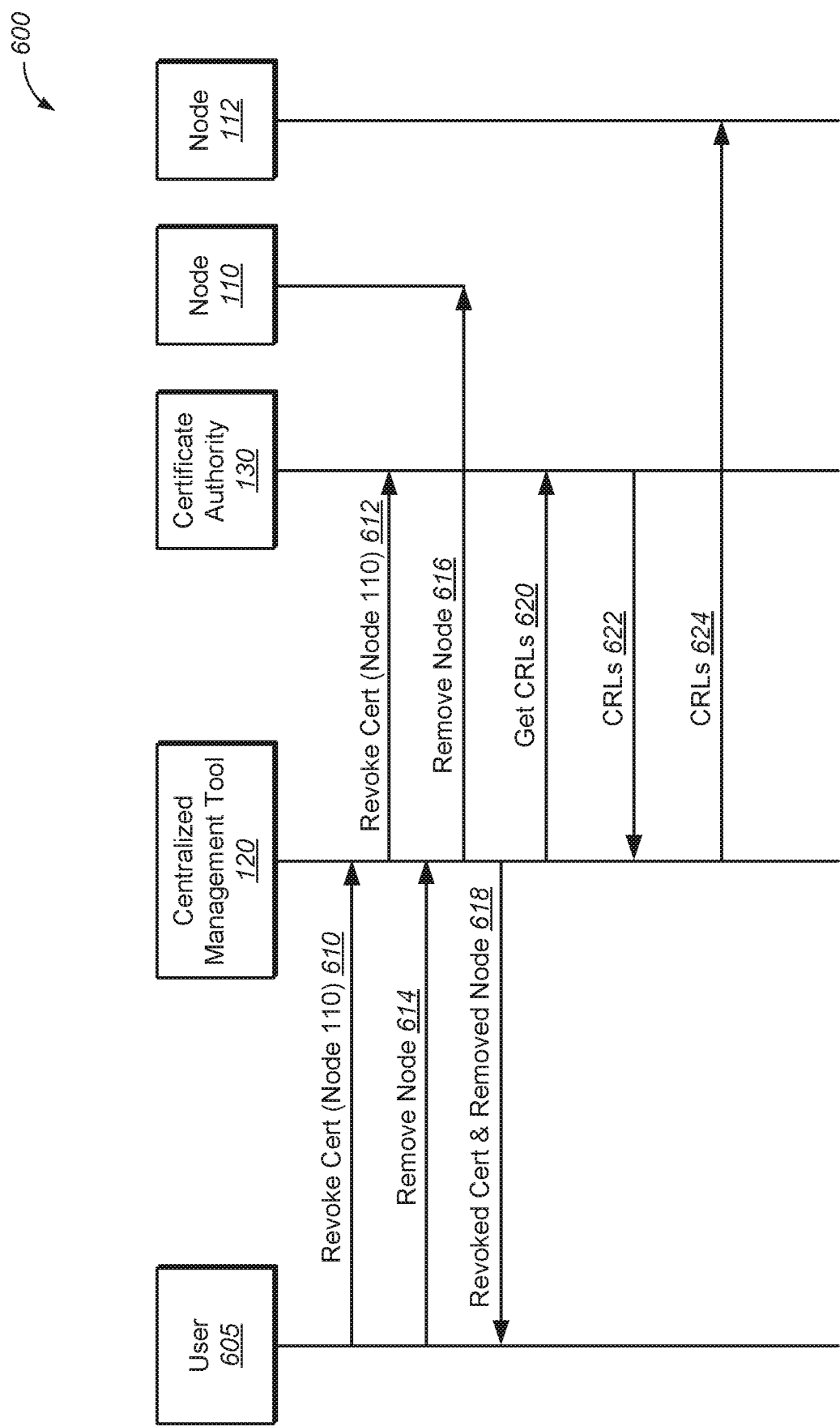
FIG. 6 depicts a flow diagram for a method for automated pushing of a certificate revocation list, according to various embodiments.

FIG. 6 depicts an embodiment of a "swim lane" flow chart for a method 600 of automated pushing of a CRL.

At 610, user 605 (e.g., administrator of system 100) revokes certificates in node 110 by way of centralized management tool 120. For example, the user is made aware that node 110 is untrustworthy and desires to revoke certificates of node 110 via a UI or CLI.

At 612, centralized management tool 120 transmits instructions to certificate authority 130 to revoke the certificates of node 110 (as instructed by user 605). As a result, node 110 is deemed to be untrustworthy.

At 614, the user provides instructions to remove node 110 from the system because it is untrustworthy.

At 616, centralized management tool 120 removes node 110 from system 100. As a result, node 110 is no longer a security risk to system 100.

At 618, centralized management tool 120 provides indication to user 605 that the certificates of node 110 were revoked and the node was removed from system 100.

At 620, centralized management tool 120 requests CRLs from certificate authority 130.

At 622, certificate authority 130 transmits updated CRLs to centralized management tool 120. The CRLs indicate that the certificates in node 110 are revoked and that node 110 is removed from system 100.

At 624, centralized management tool 120 transmits the updated CRLs to node 112 (and other nodes in system 100). As a result, node 112 (and other nodes in system 100) are aware that the certificates in node 110 are revoked and therefore node 110 is untrustworthy.

D. Example Methods of Operation

Figure 7:
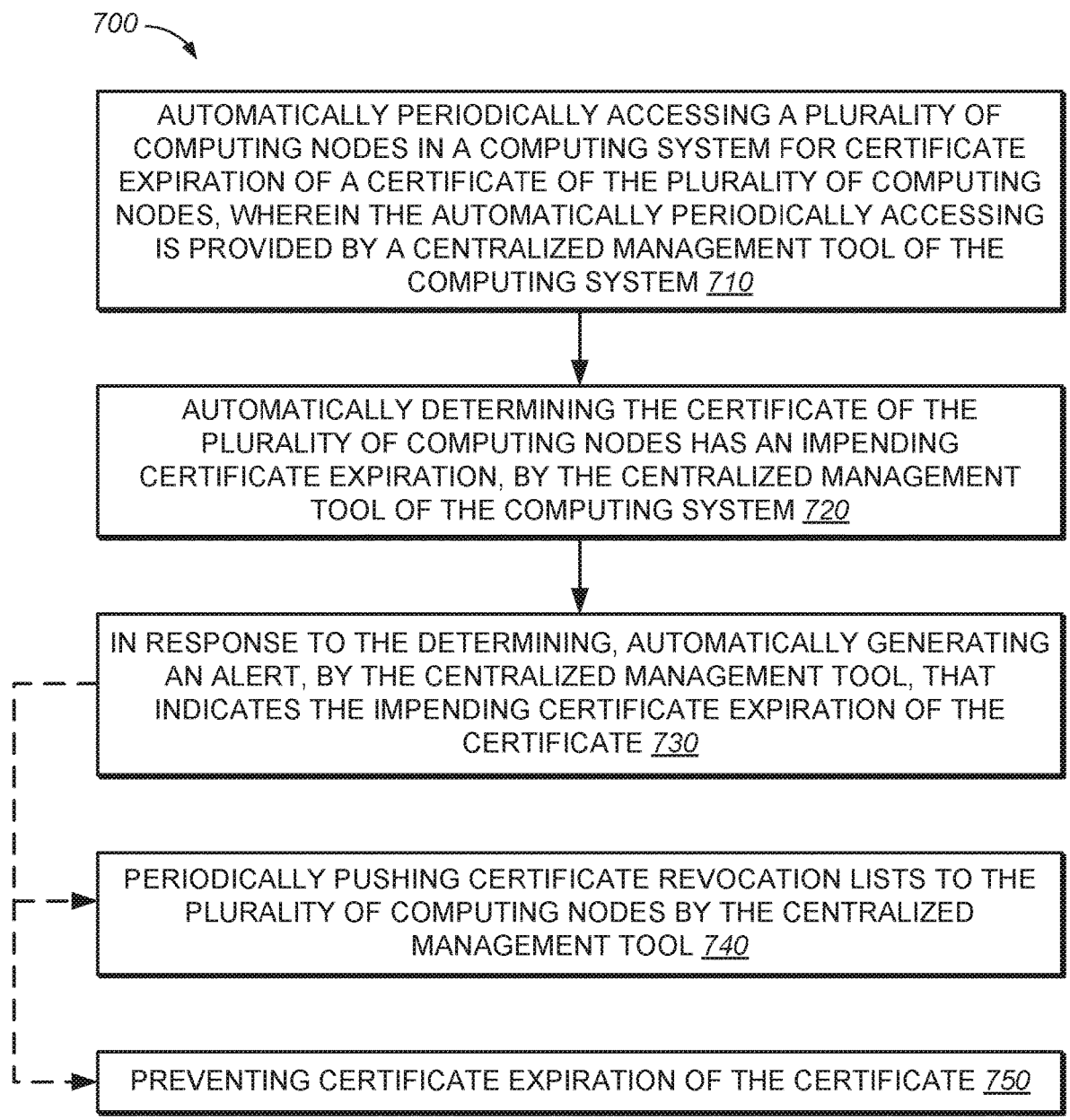
FIG. 7 depicts a flow diagram for a method for automated monitoring of certificate expiration, according to various embodiments.
Figure 8:
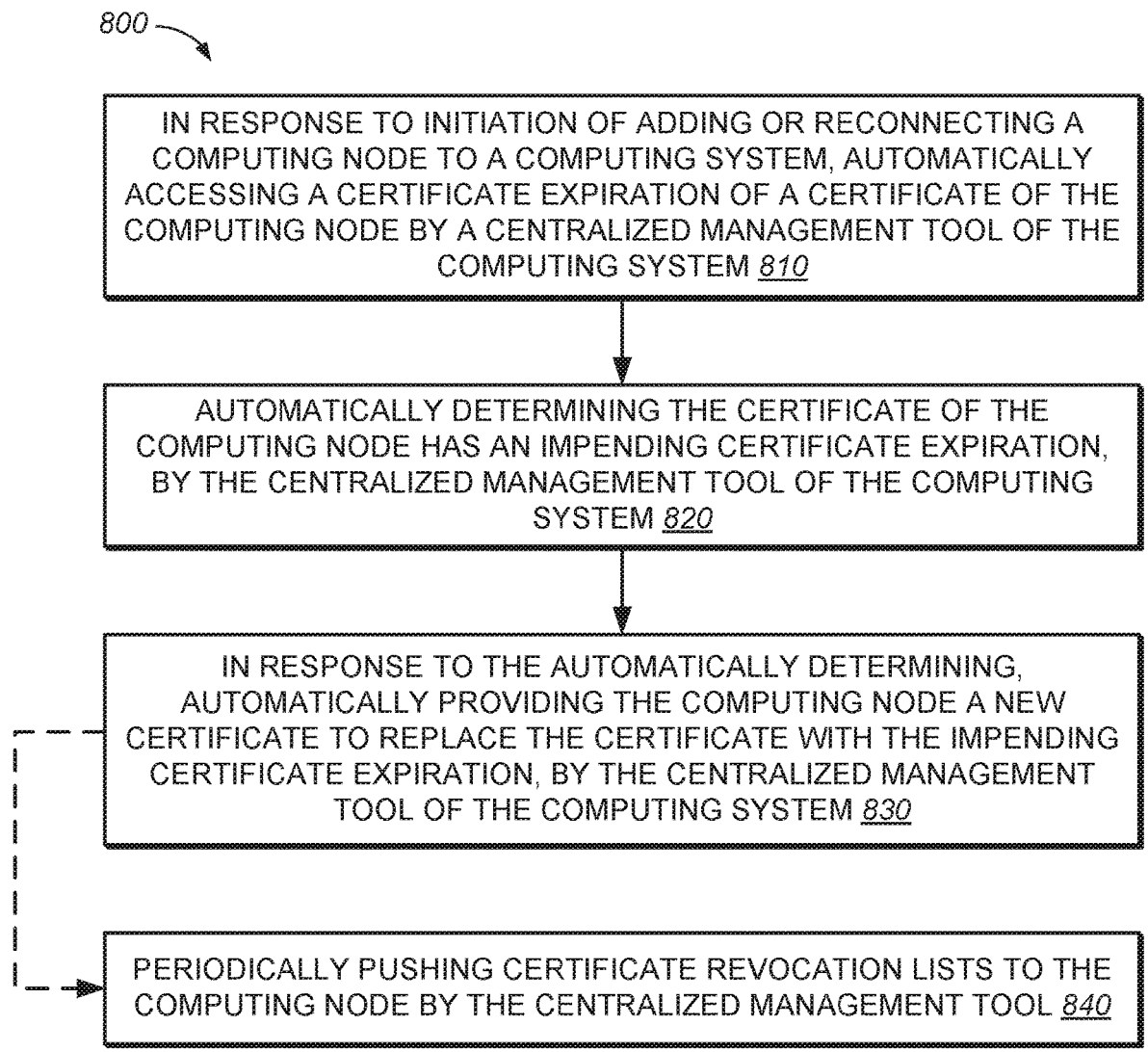
FIG. 8 depicts a flow diagram for a method for automated remediation of certificate expiration, according to various embodiments.
Figure 9:
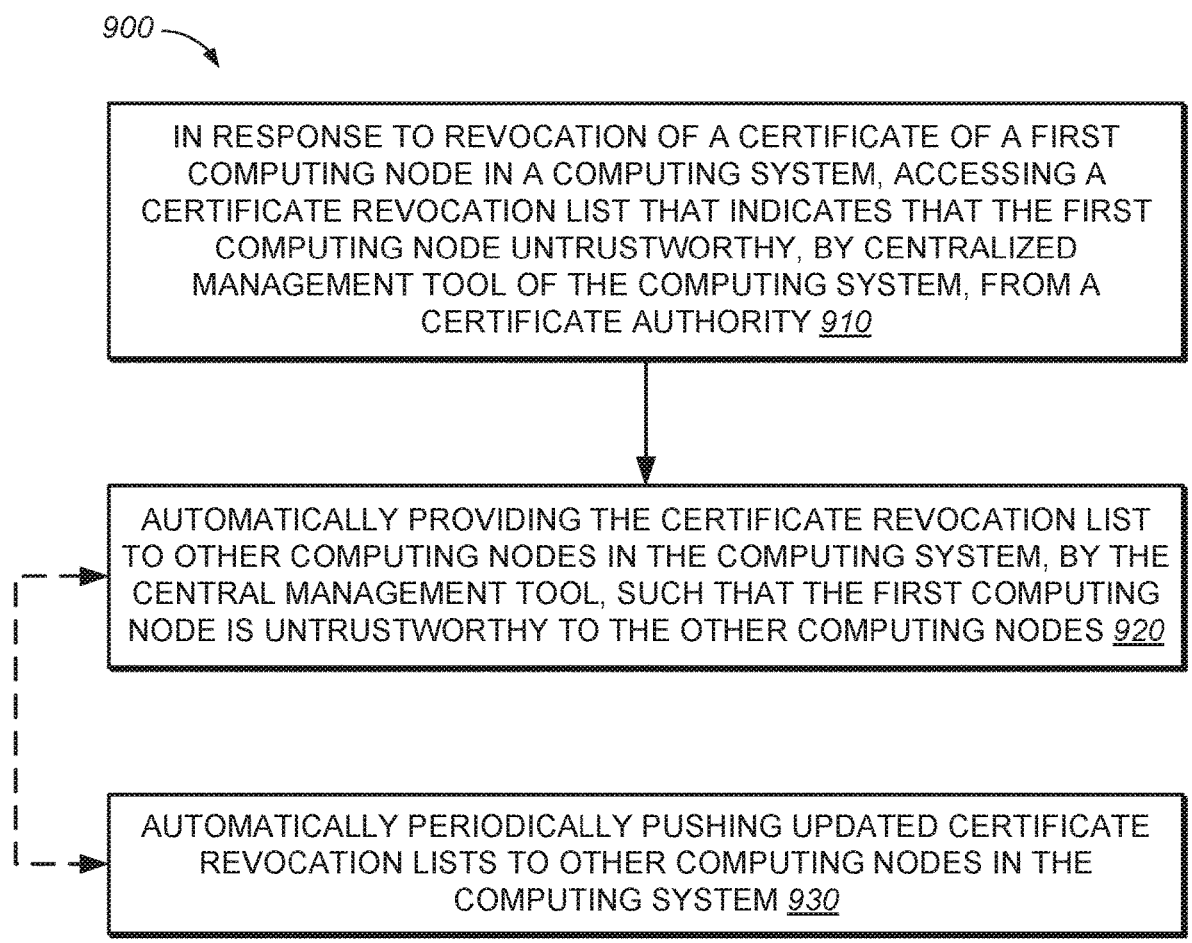
FIG. 9 depicts a flow diagram for a method automated pushing of a certificate revocation list, according to various embodiments.

The following discussion sets forth in detail the operation of some example methods of operation of embodiments. With reference to FIGS. 7, 8 and 9, flow diagrams 700, 800 and 900 illustrate example procedures used by various embodiments. Flow diagrams 700, 800 and 900 include some procedures that, in various embodiments, may include some steps that are carried out by a processor under the control of computer-readable and computer-executable instructions. In this fashion, procedures described herein and in conjunction with flow diagrams 700, 800 and 900 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments. The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 700, 800 and 900 such procedures are examples. That is, embodiments are well suited to performing various other procedures or variations of the procedures recited in flow diagrams 700, 800 and 900. Likewise, in some embodiments, the procedures in flow diagrams 700, 800 and 900 may be performed in an order different than presented and/or not all of the procedures described in one or more of these flow diagrams may be performed.

FIG. 7 depicts a process flow diagram 700 of a method for automated monitoring certificate expiration, according to various embodiments.

At 710, automatically periodically accessing a plurality of computing nodes in a computing system for certificate expiration of a certificate of the plurality of computing nodes, wherein the automatically periodically accessing is provided by a centralized management tool of the computing system. For example, centralized management tool 120 automatically and periodically accesses certificate expiration of certificates of the nodes in system 100. The centralized management tool may access the nodes for the certification expiration daily, every day, every other day, weekly, etc.

At 720, automatically determining the certificate of the plurality of computing nodes has an impending certificate expiration, by the centralized management tool of the computing. For example, centralized management tool 120 automatically determines whether or not any of the certificates have an impending certificate expiration.

At 730, in response to the determining, automatically generating an alert, by the centralized management tool, that indicates the impending certificate expiration of the certificate. If it is determined that a certificate has an impending certificate expiration, the centralized management tool generates an alert and presents the alert the user such that the user is aware of the impending certificate expiration.

At 740, periodically pushing certificate revocation lists to the plurality of computing nodes by the centralized management tool. For example, the centralized management tool periodically provides CRLs to nodes in system 100. As a result, the nodes are made aware of certificates that are revoked and therefore do not trust the nodes with the revoked certificates.

At 750, preventing certificate expiration of the certificate. For example, by alerting a user of impending certificate expiration, the user may direct the centralized management tool to replace the impending expiring certificates with new certificates. As a result, the certificates are prevented from expiring.

It is noted that any of the procedures, stated above, regarding flow diagram 700 may be implemented in hardware, or a combination of hardware with firmware and/or software. For example, any of the procedures are implemented by a processor(s) of a cloud environment and/or a computing environment.

FIG. 8 depicts a process flow diagram 800 of a method for automated remediation of certificate expiration, according to various embodiments.

At 810, in response to initiation of adding or reconnecting a computing node to a computing system, automatically accessing a certificate expiration of a certificate of the computing node by a centralized management tool of the computing system. For example, a user directs centralized management tool 120 to add or reconnect a node (e.g., host, storage device) to system 100. Then centralized management tool 120 automatically accesses the certificate expiration of any certificates in the node.

At 820, automatically determining the certificate of the computing node has an impending certificate expiration, by the centralized management tool of the computing system. For example, upon accessing the certificate expiration, centralized management tool 120 then determines whether or not the certificate has an impending certificate expiration.

At 830, in response to the automatically determining, automatically providing the computing node a new certificate to replace the certificate with the impending certificate expiration, by the centralized management tool of the computing system. For example, if it determined that there is an impending certificate expiration, then centralized management tool 120 automatically provides the computing node with a new certificate (that does not have an impending expiration) to replace the certificate with the impending certificate expiration.

At 840, periodically pushing certificate revocation lists to the computing node by the centralized management tool. For example, the centralized management tool periodically provides CRLs to nodes in system 100. As a result, the nodes are made aware of certificates that are revoked and therefore do not trust the nodes with the revoked certificates.

It is noted that any of the procedures, stated above, regarding flow diagram 800 may be implemented in hardware, or a combination of hardware with firmware and/or software. For example, any of the procedures are implemented by a processor(s) of a cloud environment and/or a computing environment.

FIG. 9 depicts a process flow diagram 900 of a method for automated pushing of a certificate revocation list, according to various embodiments.

At 910, in response to revocation of a certificate of a first computing node in a computing system, accessing a certificate revocation list that indicates that the first computing node untrustworthy, by centralized management tool of the computing system, from a certificate authority. For example, if a certificate of node 110 is revoked, then an updated CRL that indicates that the certificate is revoked is created by the certificate authority and provided to the centralized management tool.

At 920, automatically providing the certificate revocation list to other computing nodes in the computing system, by the centralized management tool, such that the first computing node is untrustworthy to the other computing nodes. For example, centralized management tool 120 pushes the updated CRL to other nodes in the system. As a result, the other nodes are made aware that the first node is untrustworthy.

At 930, automatically periodically pushing updated certificate revocation lists to other computing nodes in the computing system. For example, the centralized management tool periodically provides CRLs to nodes in system 100. As a result, the nodes are made aware of certificates that are revoked and therefore do not trust the nodes with the revoked certificates.

It is noted that any of the procedures, stated above, regarding flow diagram 900 may be implemented in hardware, or a combination of hardware with firmware and/or software. For example, any of the procedures are implemented by a processor(s) of a cloud environment and/or a computing environment.

E. Example Host Computer System

As described above, computing system 100, in one embodiment, is a virtualized computing environment, wherein the nodes are hosts (or host computing system) within the virtualized computing environment.

Figure 10:
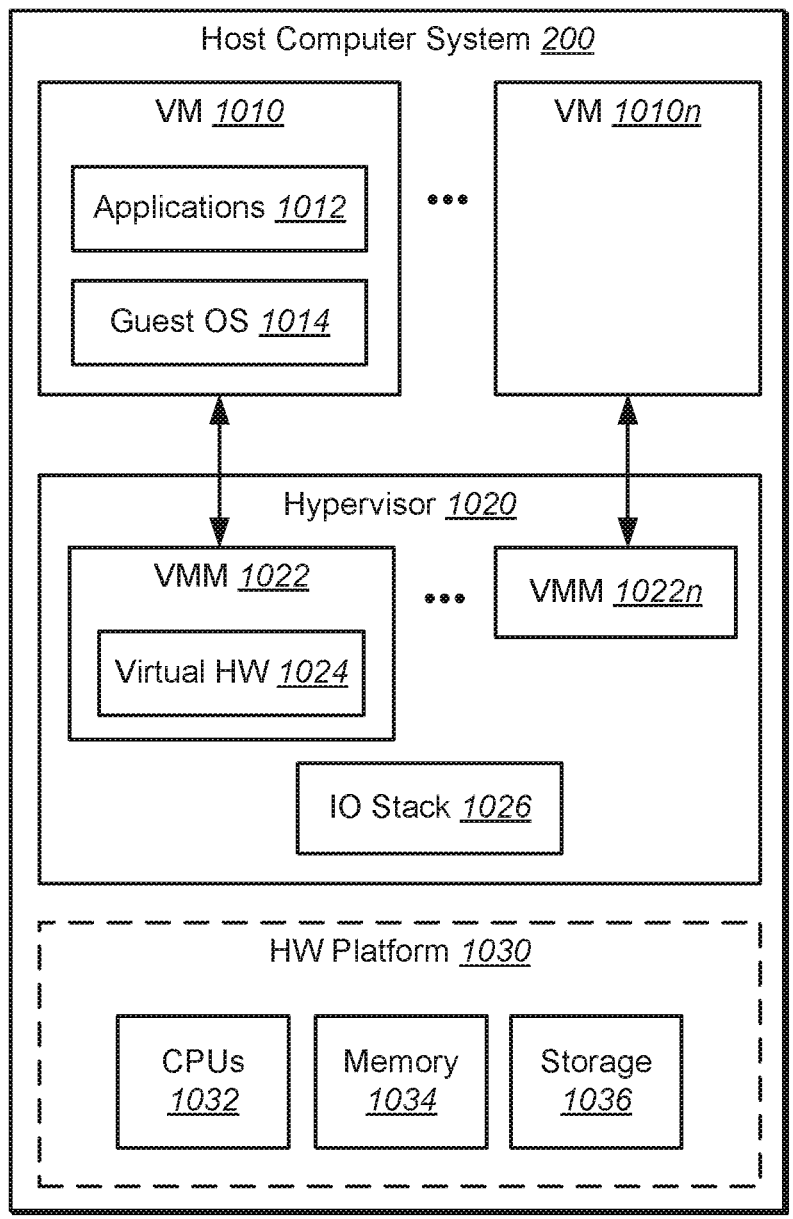
FIG. 10 depicts a block diagram of a host computing system, according to various embodiments.

FIG. 10 is a schematic diagram that illustrates a virtualized computer system that is configured to carry out one or more embodiments of the present invention. The virtualized computer system is implemented in a host computer system 1000 including hardware platform 1030. In one embodiment, host computer system 1000 is constructed on a conventional, typically server-class, hardware platform.

Hardware platform 1030 includes one or more central processing units (CPUs) 1032, system memory 1034, and storage 1036. Hardware platform 1030 may also include one or more network interface controllers (NICs) that connect host computer system 1000 to a network, and one or more host bus adapters (HBAs) that connect host computer system 1000 to a persistent storage unit.

Hypervisor 1020 is installed on top of hardware platform 1030 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 1024 for virtual machine 1010 supports the installation of guest OS 1014 which is capable of executing applications 1012 within virtual machine 1010.

Guest OS 1014 may be any of the well-known commodity operating systems, and includes a native file system layer, for example, either an NTFS or an ext3FS type file system layer. IOs issued by guest OS 1014 through the native file system layer appear to guest OS 1014 as being routed to one or more virtual disks provisioned for virtual machine 1010 for final execution, but such IOs are, in reality, reprocessed by IO stack 1026 of hypervisor 1020 and the reprocessed IOs are issued, for example, through an HBA to a storage system.

Virtual machine monitor (VMM) 1022 and 1022n may be considered separate virtualization components between the virtual machines and hypervisor 1020 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

Standalone Tool for Certificate Management

As discussed herein, SSL/TLS certificate generation, installation, and replacement are tedious, time consuming and error-prone workflows that occur within cloud based virtual products. Further, certificate management can include a number of operational phases of a lifecycle which have also been discussed herein. The phases can include, but are not limited to, a refresh, an inventory, a monitor and a retirement. Although four phases are disclosed, they could be combined or separated into any number of phases. The grouping provided herein is one embodiment that is used for purposes of clarity.

As discussed herein, during the refresh phase, certificate validity is tracked, they are replaced prior to expiration, and proper installation is verified. The inventory and monitoring phases include logging pertinent information about certificate deployment and continually monitoring inventory to ensure compliance.

The retirement phase records the status of expired certificates, records the identification, revocation, and/or replacement of compromised certificates, and the like. In one embodiment, the retirement phase will also include an identifier for the administrator that authorized, verified, scheduled, or otherwise interacted with the certificate.

Figure 11:
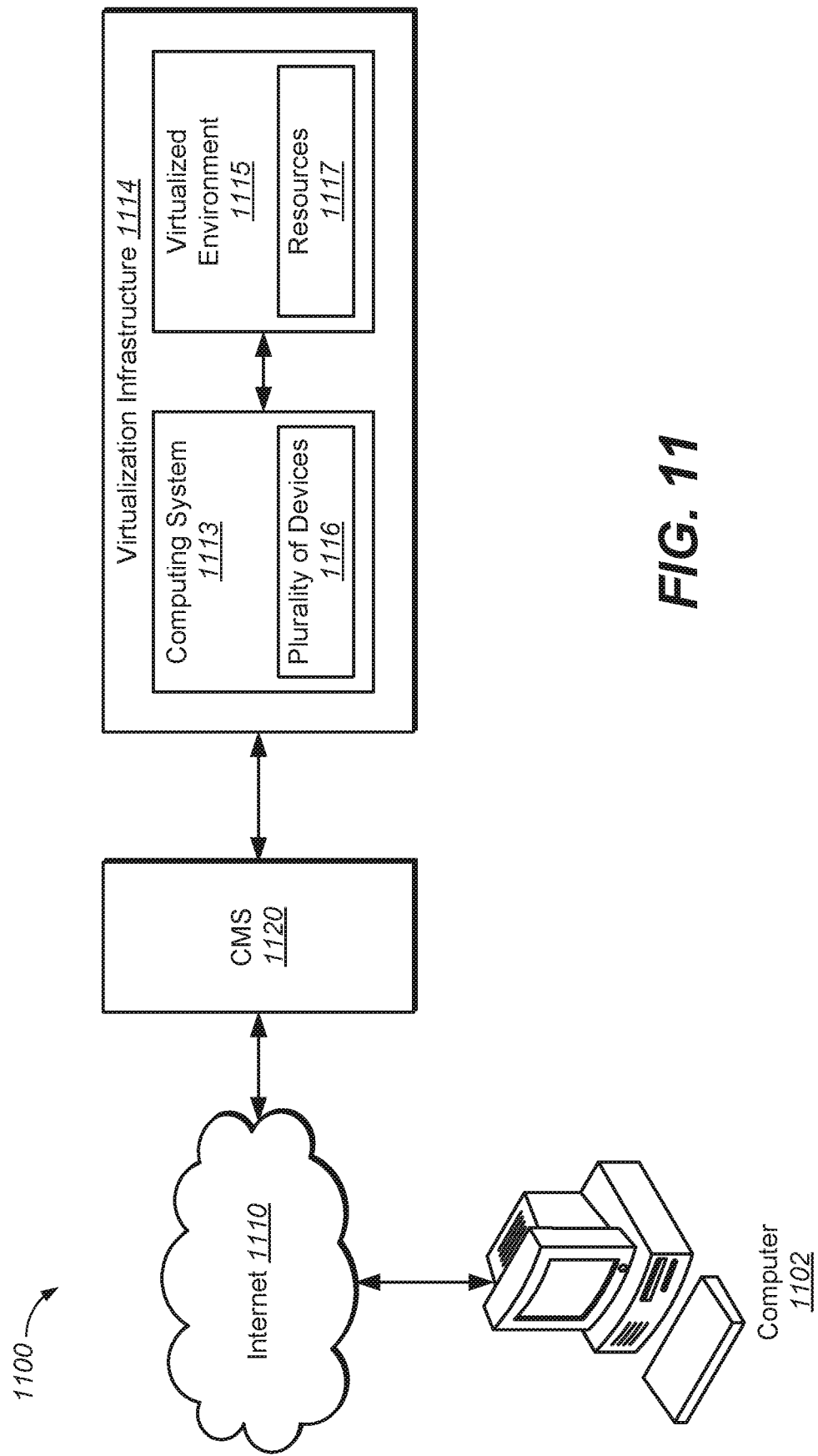
FIG. 11 illustrates an example cloud-based computing environment communicatively coupled with an out-of-network computer system, according to various embodiments.

FIG. 11 illustrates a certificate management service (CMS 1120) operating outside of an example virtualization infrastructure 1114 (which is similar to computing system 100 discussed herein) and communicatively coupled with an out-of-network computing device 1102. In the cloud-computing paradigm, computing cycles and data-storage facilities are provided to organizations and individuals by cloud-computing providers. In addition, larger organizations may elect to establish private cloud-computing facilities in addition to, or instead of subscribing to computing services provided by public cloud-computing service providers. In FIG. 11, a system administrator for an organization, using out-of-network computing device 1102, accesses the virtualization infrastructure 1114, through a connection such as, but not limited to, the Internet 1110 and through the CMS 1120 (discussed in further detail in FIG. 13).

For example, the administrator can, using out-of-network computing device 1102, configure virtual computer systems and even entire virtual data centers and launch execution of application programs on the virtual computer systems and virtual data centers in order to carry out any of many different types of computational tasks.

In one embodiment, virtualization infrastructure 1114 includes computing system 1113 and virtualized environment 1115, according to various embodiments. In general, computing system 1113 and virtualized environment 1115 are communicatively coupled over a network such that computing system 1113 may access functionality of virtualized environment 1115.

In one embodiment, computing system 1113 may be a system (e.g., enterprise system) or network that includes a combination of computer hardware and software. The corporation or enterprise utilizes the combination of hardware and software to organize and run its operations. To do this, computing system 1113 uses resources 1117 because computing system 1113 typically does not have dedicated resources that can be given to the virtualized environment 1115. For example, an enterprise system (of the computing system 1113) may provide various computing resources for various needs such as, but not limited to information technology (IT), security, email, etc.

In various embodiments, computing system 1113 includes a plurality of devices 1116. The devices are any number of physical and/or virtual machines. For example, in one embodiment, computing system 1113 is a corporate computing environment that includes tens of thousands of physical and/or virtual machines. It is understood that a virtual machine is implemented in virtualized environment 1115 that includes one or some combination of physical computing machines. Virtualized environment 1115 provides resources 1117, such as storage, memory, servers, CPUs, network switches, etc., that are the underlying hardware infrastructure for virtualization infrastructure 1114.

The physical and/or virtual machines of the computing system 1113 may include a variety of operating systems and applications (e.g., operating system, word processing, etc.). The physical and/or virtual machines may have the same installed applications or may have different installed applications or software. The installed software may be one or more software applications from one or more vendors.

Each virtual machine may include a guest operating system and a guest file system. Moreover, the virtual machines may be logically grouped. That is, a subset of virtual machines may be grouped together in a container (e.g., VMware apt). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The virtualization infrastructure may also include a plurality of virtual datacenters. In general, a virtual datacenter is an abstract pool of resources (e.g., memory, CPU, storage). It is understood that a virtual data center is implemented on one or some combination of physical machines.

In various embodiments, computing system 1113 may be a cloud environment, built upon a virtualized environment 1115. Computing system 1113 may be located in an Internet connected datacenter or a private cloud computing center coupled with one or more public and/or private networks. Computing system 1113, in one embodiment, typically couples with a virtual or physical entity in a computing environment through a network connection which may be a public network connection, private network connection, or some combination thereof. For example, a user may connect, via an Internet connection, with computing system 1113 by accessing a web page or application presented by computing system 1113 at a virtual or physical entity.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESX™ hypervisor, a VMware Exit hypervisor, etc.) For example, if hypervisor is a VMware ESX™ hypervisor, then virtual functionality of the host is considered a VMware ESX™ server.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems.

During use, the virtual machines perform various workloads. For example, the virtual machines perform the workloads based on executing various applications. The virtual machines can perform various workloads separately and/or in combination with one another.

Example VMware EVO SDDC Rack

Figure 12:
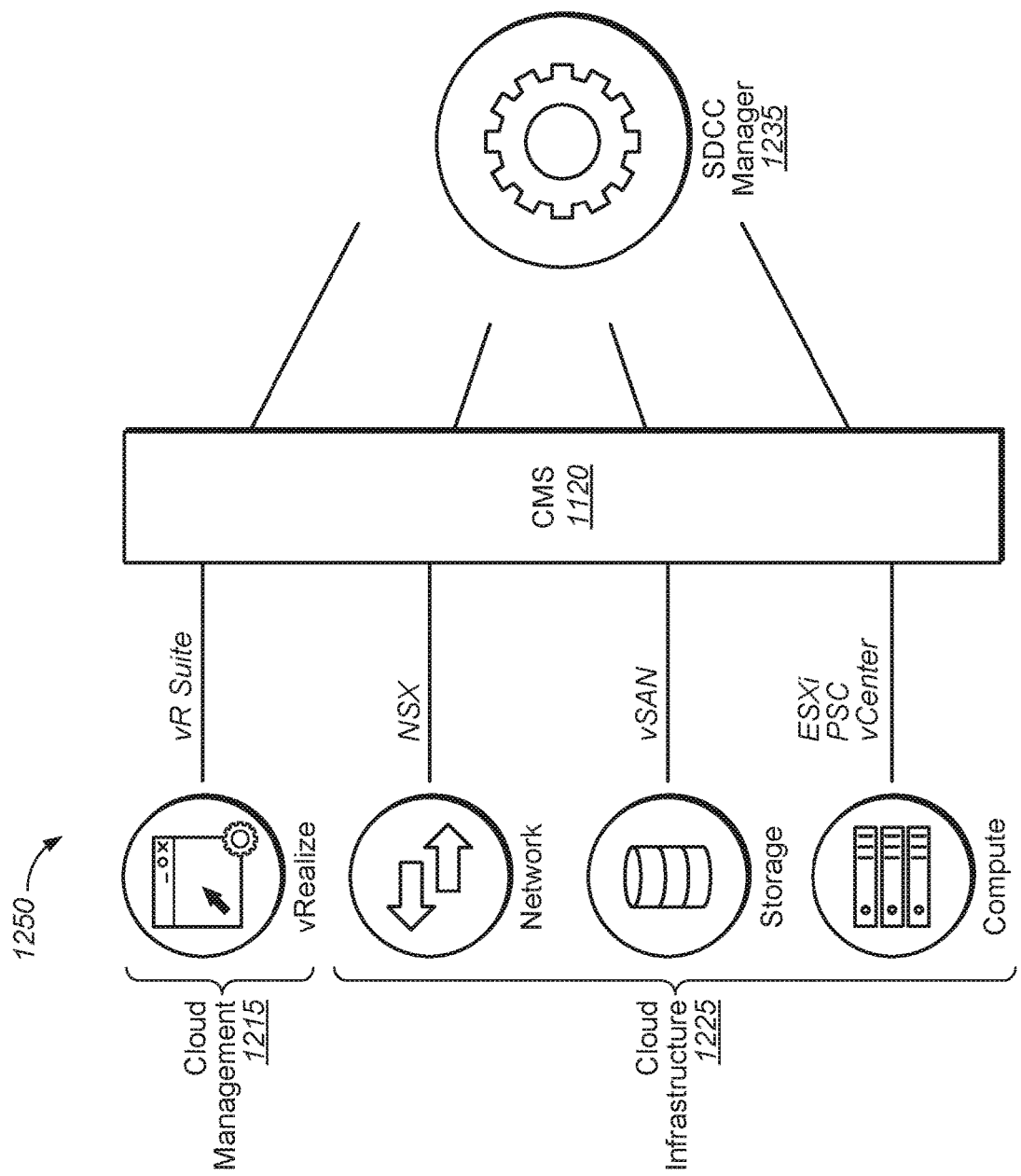
FIG. 12 illustrates a block diagram of an example SDDC upon which embodiments described herein may be implemented, according to various embodiments.

With reference now to FIG. 12, a block diagram of an SDDC 1250 is shown in accordance with an embodiment. In one embodiment, SDDC 1250 is a combination of software and hardware. Moreover, although there are some specific components of SDDC 1250 discussed herein and contained in the Figures, the technology may be well suited to different arrangements, organization, or the like. In general, SDDC 1250 utilizes the concepts of virtualization across all data center resources and services over a cloud infrastructure 1225 (e.g., compute, storage, and networking) to deliver a fully automated, zero-downtime infrastructure that can transparently include different hardware over time. SDDC 1250 provides abstraction, pooling, and automation of the compute, storage, and networking cloud infrastructure 1225 services. Under SDDC 1250, policy-driven automation will enable provisioning and ongoing management of both physical and logical compute, storage, and network services.

SDDC 1250 also includes management capabilities that are part of a dedicated management infrastructure, e.g., cloud management 1215. The cloud management 1215 capabilities include aspects such as inventory management, security management, performance management, and availability management.

Inventory management refers to aspects such as a hardware abstraction layer that interfaces with the hardware components such as servers with direct attached storage (DAS), switches, power distribution units (PDUs), and other physical devices. It is responsible for discovery, inventory, monitoring, configuration, and lifecycle management of individual servers or switches. In one embodiment, the SDDC manager 1235 will automatically discover new devices and processes hardware events (e.g., alarms, sensor data threshold triggers) and state changes. The SDDC manager 1235 also supports rack-level boot-up sequencing of hardware components and provides services such as secure, remote, hard reset of these components.

Figure 13:
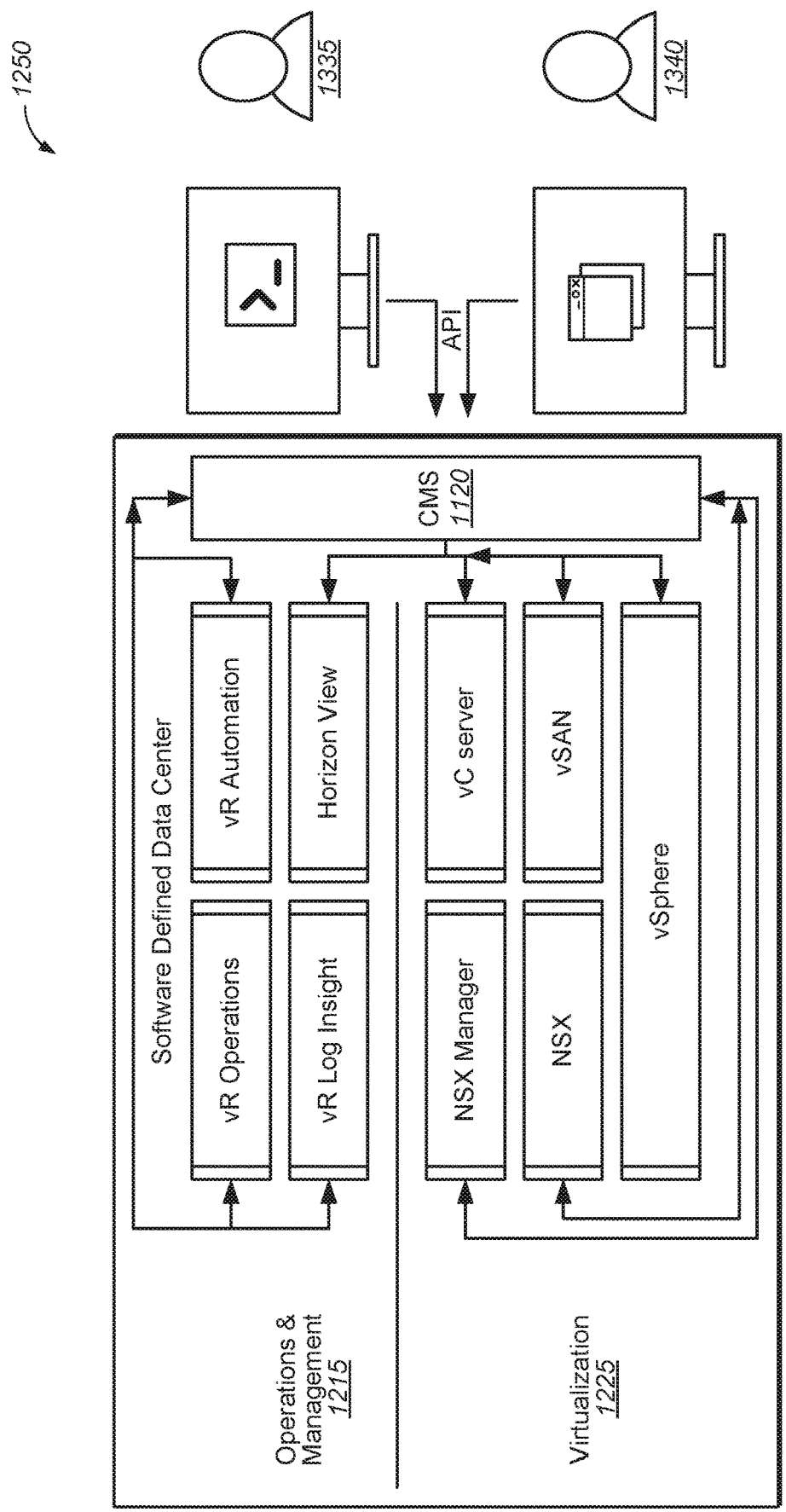
FIG. 13 illustrates a block diagram of another layout of an SDDC with user interfaces is shown in accordance with an embodiment

Referring now to FIG. 13, a block diagram of another layout of an SDDC 1250 with user interfaces is shown in accordance with an embodiment. In one embodiment, SDDC 1250 of FIG. 13 illustrates another breakdown of operations and management 1215 and virtualization 1225. For example, management 1215 can include components such as vR operations, automation, log insight, horizon view, or the like. Virtualization 1225 can include components such as NSX manager, vC server, NSX, vSAN, vSphere, or the like. In one embodiment, the user interface can be a command line interface (CLI) user 1335, a user interface (UI) user 1340, both the CLI user 1335 and the UI user 1340, a different user, or a variation thereof.

Figure 14:
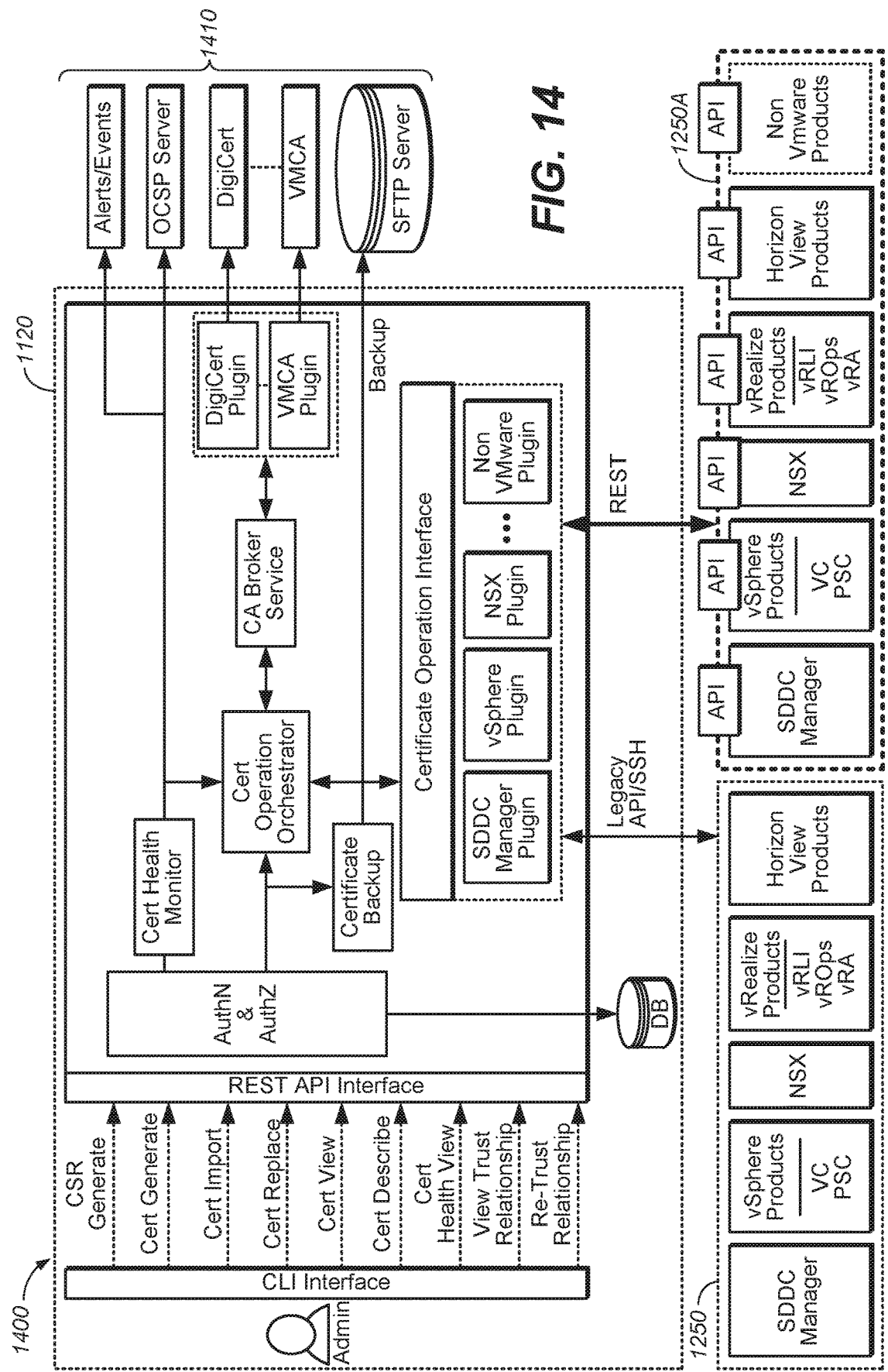
FIG. 14 depicts a block diagram of a standalone tool for certificate management, according to various embodiments.

FIG. 14 is a block diagram 1400 of a standalone tool for certificate management, in accordance with an embodiment. In one embodiment, CMS 1120 is a single pane of class solution for SDDC certificate management. For example, CMS 1120 will integrate with the SDDC manager UI but is packaged as an independent tool for VMware validated design (VVD) consumption.

In one embodiment, CMS 1120 will facilitate certificate life cycle management (LCM) operations for all the components in an SDDC. CMS 1120 will have an orchestration module and interact with the individual components to perform the certificate replacement. Each component in the SDDC 1250 (e.g., such as, but not limited to the SDDC Manager, vSphere products, NSX, vRealize products, Horizon View products, or the like) will provide a capability to perform certificate management operations through an API such as those shown in SDDC API 1250A. Moreover, certificate LCM operations can be orchestrated for a specific or a set of or all component/s in the SDDC.

For example, CMS 1120 will be part of SDDC manager 1235 VM and will run as a standalone service when SDDC manager 1235 is up and running. In one embodiment, the SDDC admin can use a CLI interface (such as computer 1102) to access CMS 1120 and perform certificate operations such as, but not limited to, cert-replace, cert-validate, cert-generate, cert-view, cert-health-view, cert-ops-history-view, cert-trust-relationship-view, and the like.

Figure 15:
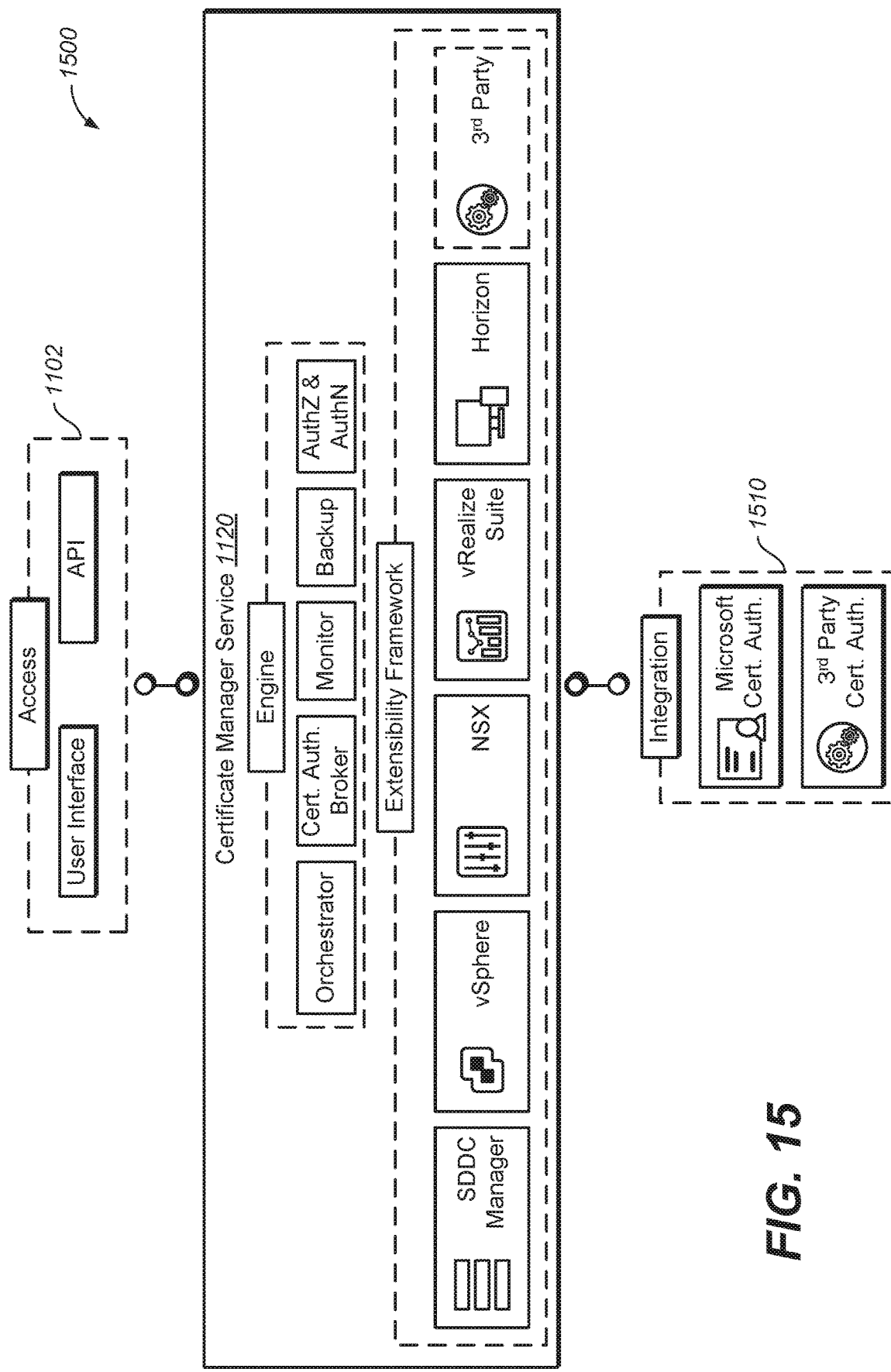
FIG. 15 depicts a block diagram of a full-stack architecture for the standalone tool for certificate management, according to various embodiments.

FIG. 15 is a block diagram 1500 of a full-stack architecture for the standalone tool for certificate management, in accordance with an embodiment. In general, CMS 1120 is a standalone architecture that will be integrated and contained in the SDDC manager 1235 for a seamless certificate managing experience. CMS 1120 will be a plug-and-play component that is modularized to seamlessly operate between the SDDC 1250 and the user interface 1102. In one embodiment, an integration component 1510 is used to integrate CMS 1120 into any existing architecture for any cloud infrastructure provider. The integration component 1510 could include certifying authority from a third party, from a big name party, or the like.

Figure 16:
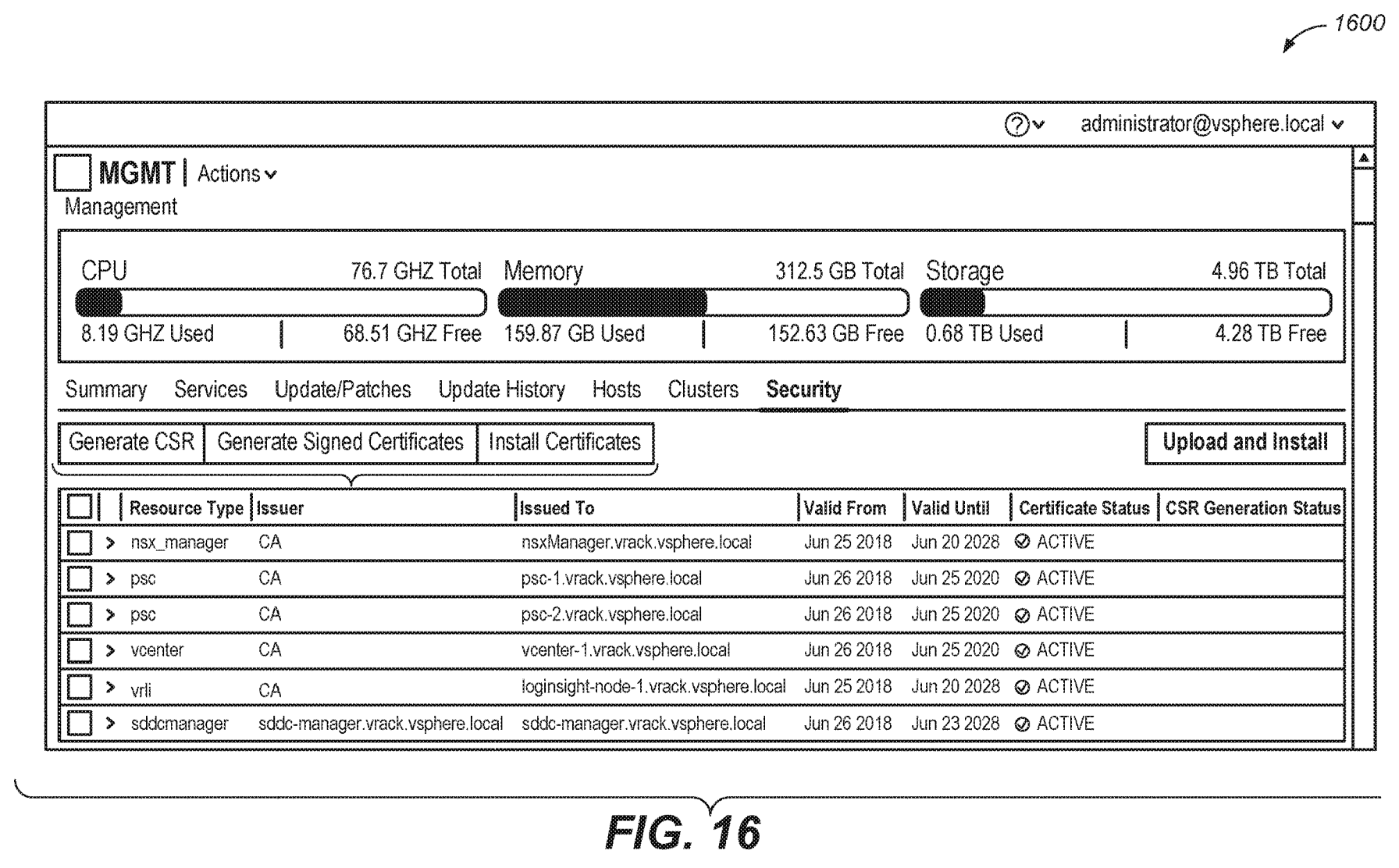

FIG. 16 is a block diagram of the CMS 1120 interactive screen 1600 to a GUI that provides a single management interface for all SDDC certificate operations. In one embodiment, the interactive screen 1600 includes a number of different tabs such as summary, services, updates/patches, update history, hosts, clusters, security, and the like. Further, the interactive screen 1600 can be used to generate CSR, generate certificates, upload/install certificates, view certificates, certificate status, certificate validity, ops history view, trust relationship view, and the like. In one embodiment, the selection of a tab or operation on the interactive screen 1600 will bring the user to a drilled down version of the interactive screen (e.g., a pop-up, new window, new tab, etc.) that will allow the user to work on the desired operation. Once the user has completed the drilling down, the user can select a "home" option to return to the interactive screen 1600 for a "whole" view or to select a different operation.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A non-transitory computer-readable storage medium having instructions embodied therein that when executed cause a computer system to perform a method for using a standalone tool for certificate management in a software defined data center (SDDC), said method comprising:
providing the standalone tool for certificate management between a plurality of computing nodes and a management node of the SDDC;
determining, with the standalone tool for certificate management, a certificate status for each of said plurality of computing nodes in the SDDC;
determining, with the standalone tool for certificate management, any certificate operations for each of said plurality of computing nodes in the SDDC;
presenting the certificate status and any of the certificate operations in a consolidated view;
presenting the consolidated view in a single pane of a graphic user interface (GUI);
presenting, in the single pane of the GUI, a proactive view of an upcoming SDDC certificate operation;
presenting, in the single pane of the GUI, a notification of a due SDDC certificate operation; and
presenting, in the single pane of the GUI, a notification of an overdue SDDC certificate operation.

2. The non-transitory computer-readable storage medium of claim 1, further comprising:
providing a backup capability for any certificate replacement operation, said backup capability returning a node's certificate to a pre-updated state when a certificate replacement operation fails.

3. The non-transitory computer-readable storage medium of claim 1, further comprising:
providing an authorization record for each certificate replacement operation, said authorization record identifying an authorizing agent for each certificate replacement operation.

4. A computer-implemented method for using a standalone tool for certificate management in a software defined data center (SDDC), said computer-implemented method comprising:
providing the standalone tool for certificate management between a plurality of computing nodes and a management node of the SDDC;
determining, with the standalone tool for certificate management, a certificate status for each of said plurality of computing nodes in the SDDC;
determining, with the standalone tool for certificate management, any certificate operations for each of said plurality of computing nodes in the SDDC; and
presenting the certificate status and any of the certificate operations in a consolidated view;
presenting an authorization record for each certificate replacement operation, said authorization record identifying an authorizing agent for each certificate replacement operation;
presenting, in a single pane of a graphic user interface (GUI), a notification of a due SDDC certificate operation; and
presenting, in the single pane of the GUI, a notification of an overdue SDDC certificate operation.

5. The computer-implemented method of claim 4, further comprising:
providing a backup capability for any certificate replacement operation, said backup capability returning a node's certificate to a pre-updated state when a certificate replacement operation fails.

6. The computer-implemented method of claim 4, further comprising:
presenting the consolidated view in a single pane of a graphic user interface (GUI); and
presenting, in the single pane of the GUI, a proactive view of an upcoming SDDC certificate operation.

7. The computer-implemented method of claim 4, further comprising:
plugging the standalone tool for certificate management into any existing SDDC.

8. The computer-implemented method of claim 4, further comprising:
plugging the standalone tool for certificate management into any new SDDC build.

* * * * *